United States Patent Office 3,242,177
Patented Mar. 22, 1966

3,242,177
7-(S-TRIAZINYL-AMINO)-3-ARYL-COUMARIN COMPOUNDS
Carl-Wolfgang Schellhammer, Opladen, Eberhart Degener, Leverkusen, Hans-Georg Schmelzer, Cologne-Stammheim, and Annemarie Wagner, Leverkusen, Germany, assignors to Farbenfabriken Bayer Aktiengesellschaft, Leverkusen, Germany, a corporation of Germany
No Drawing. Filed Apr. 27, 1964, Ser. No. 362,935
Claims priority, application Germany, May 11, 1963,
F 39,708
6 Claims. (Cl. 260—249.5)

The present invention relates to coumarin compounds; more particularly it concerns 7-(s-triazinylamino)-3-aryl-coumarin compounds of the general formula

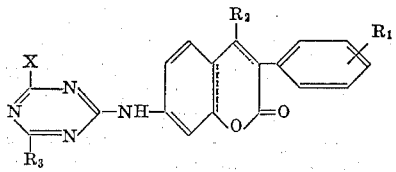

wherein $R_1$ represents hydrogen, a lower alkyl radical such as methyl or ethyl, a lower alkoxy group such as methoxy or ethoxy, or halogen especially chlorine, and $R_2$ is hydrogen or methyl, whilst $R_3$ denotes hydrogen, an alkyl, cycloalkyl, aralkyl or aryl radical and X is chlorine, a hydroxy group, an alkoxy or aryloxy group, an alkoxyalkoxy group or a

group where $R_4$ and $R_5$ independently represent hydrogen or optionally substituted lower alkyl radicals, such methyl, ethyl or hydroxy ethyl, or optionally substituted cycloaliphatic, araliphatic, aryl radicals, saturated heterocyclic radicals or radicals which together with the nitrogen atom form a heterocyclic ring system.

The coumarin compounds of the specified formula are very useful compounds. In particular they can be used as brightening agents, for instance for brightening textile materials, paper, leather and soaps; they are particularly suitable for brightening synthetic fibres, such as for instance polyamide, polyurethane, polyacrylonitrile and polyester fibres, and also for brightening cellulose ester fibres, for brightening plastics such as polyvinyl chloride, for example, and for brightening varnishes of cellulose esters or nitrocellulose.

The application of the coumarin compounds of the present invention as brightening agents can be carried out by the usual method, either in the form of their solutions in organic solvents or in the form of their solutions or dispersions in water. The coumarin compounds can also be incorporated in casting or spinning compounds which serve for the production of artificial structures such as films, fibres, threads or the like. The amounts required for brightening purposes may vary within wide limits; they can readily be established by preliminary experiments and are, in general, far less than 1%, referred to the weight of the material to be brightened.

By way of example, some of the coumarin compounds of the general formula specified above which can be used as brightening agents are listed in the following table:

TABLE

| | $R_1$ | $R_2$ | $R_3$ | X | Melting point (° C.) |
|---|---|---|---|---|---|
| (a) | H | H | $CH_3$ | Cl | 265 |
| (b) | H | H | $CH_3$ | $OCH_3$ | 228 |
| (c) | H | H | $CH_3$ | $OC_2H_4OCH_3$ | 139 |
| (d) | H | H | $CH_3$ | —O—C$_6$H$_5$ | 230 |
| (e) | H | H | $CH_3$ | $NH_2$ | 235 |
| (f) | H | H | $CH_3$ | N(CH$_2$CH$_2$OH)$_2$ | 225 |
| (g) | $CH_3$ | H | $CH_3$ | N(CH$_3$)$_2$ | 213 |
| (h) | H | H | $C_2H_5$ | Cl | 241 |
| (i) | H | H | $C_2H_5$ | $OCH_3$ | 202 |
| (k) | H | H | CH(CH$_3$)$_2$ | $OCH_3$ | 165 |
| (l) | H | H | C$_6$H$_4$X | $OC_2H_5$ | 179 |
| (m) | H | H | $C_6H_5$—$CH_2$ | $OCH_3$ | 167 |
| (n) | H | H | $CH_3$ | —NH—C$_6$H$_4$—$CH_3$ | 278 |
| (o) | H | H | $C_6H_5$ | Cl | 289 |
| (p) | H | H | H | Cl | 297 |
| (qu) | H | H | H | $OCH_3$ | 225 |
| (r) | H | H | $CH_3$ | OH | 323 |

The listed 7-(s-triazinylamino)-3-aryl-coumarin compounds may for instance be obtained by condensing 7-amino-3-aryl-coumarin compounds of the formula

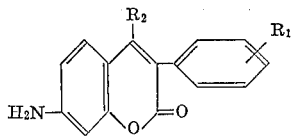

with s-triazines of the formula

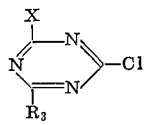

wherein $R_1$, $R_2$, $R_3$ and X have the above specified significance, in the presence of an acid acceptor, or by arylating 7-(s-triazinylamino)-coumarin compounds of the formula

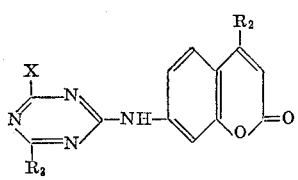

wherein $R_2$, $R_3$ and X have the above stated significance, with aryldiazonium salts of the formula

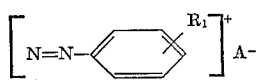

wherein $R_1$ has the above stated significance and $A^-$ is an anion, in the presence of cupric chloride.

The coumarin compound listed under (a) in the table may for instance be prepared by the following method:

A solution of 8.2 g. of 2,4-dichloro-6-methyl-s-triazine in 200 cc. of acetone is treated first with 200 g. of ice and then during 10 minutes with a suspension of 11.9 g. of 7-amino-3-phenyl-coumarin in 200 cc. of acetone whilst the temperature of the mixture is kept at less than 10° C. and the pH value of the mixture is kept at 6.5–7 by the addition of a 10% solution of sodium carbonate. Stirring of the reaction mixture is thereafter continued at room temperature for about 12 hours longer. The separated crystals are filtered off with suction, washed with water and dried at 90° C.

Those compounds which in place of the chlorine atom contain one of the other substituents which may be considered for X can be obtained from the compound (a) thus obtained, by reaction with the corresponding alkoxides, phenoxides or amines. Compounds in which $R_3$ denotes one of the other groups in place of the methyl group are available by the application of the appropriately substituted dichlorotriazines.

The compounds of the present invention when applied as brightening agents are distinguished from the 7-(s)triazinylamino)-3-aryl-coumarin compounds of the formula

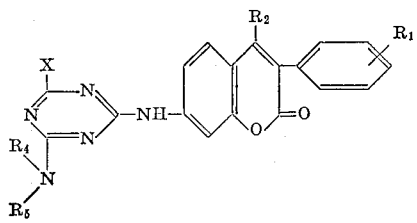

wherein $R_1$, $R_2$, $R_4$ and $R_5$ as well as X have the above mentioned significance and which have already been proposed for brightening purposes; compounds of the present invention produce brightening effects which are more stable to light and give a less greenish shade.

The following examples serve to further illustrate the invention without, however, limiting its scope.

Example 1

1 g. of one of the coumarin compounds listed under (a), (h), (k), (l) and (m) in the table is incorporated on a roll into 1000 g. of opaque plasticised polyvinyl chloride. The material is then exceedingly well brightened and exhibits a neutral white colour shade.

Example 2

0.6 g. of one of the coumarin compounds listed under (b) and (i) in the table is dissolved in 1000 g. of a colourless varnish of cellulose acetate or nitrocellulose. The varnish is then spread as a thin coating onto a colourless background. After drying, the film of varnish has been exceedingly well brightened to a reddish colour shade.

Example 3

A fabric of polyamide fibers is introduced at 30° C. and at a goods-to-liquor ratio of 1:40 into an aqueous bath which contains, per litre, 1 g. of oleyl sulphonate, 0.75 g. of formic acid and 0.075 g. of the coumarin compound listed under (b) in the table. The bath is then warmed to 90–95° C. and kept at this temperature for 30–60 minutes whilst the fabric is moved about in the bath at a moderate rate. The fabric is subsequently rinsed and dried. The textile material treated by this method exhibits a very good neutral brightening effect.

Example 4

A fabric of polyacrylonitrile fibers is treated by the method described in Example 3, except for the difference that in place of the coumarin compound listed under (b), the bath contains one of the coumarin compounds listed under (d) and (e) in the table. The textile material treated by this method then also exhibits a very good neutral brightening effect.

Example 5

A fabric of cellulose acetate fibers is treated at 60° C. by the method described in Example 3, except for the difference that in place of the coumarin compound listed under (b), the bath contains one of the coumarin compounds listed under (c), (f) and (g) in the table. The textile material treated by this method exhibits a very good brightening effect with a reddish colour shade.

Example 6

A fabric of polyester fibers is introduced at a goods-to-liquor ratio of 1:40 into a bath which contains, per litre, 1.5 g. of oleyl sulphonate, 0.75 g. of formic acid and 0.1 g. of one of the coumarin compounds listed under (b) or (i) in the table. Thereafter, the bath is slowly heated to boiling and kept at this temperature for 30–60 minutes, whilst the fabric is moved about in the bath at a moderate rate. The fabric is subsequently rinsed and dried. The material treated by this method has been exceedingly well brightened to a neutral shade.

We claim:

1. A compound of the formula

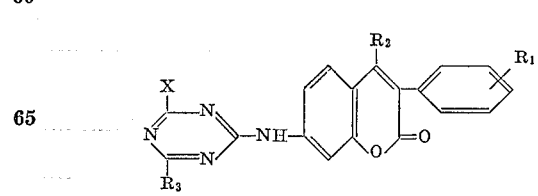

wherein $R_1$ is a member selected from the group consisting of hydrogen, lower alkyl, lower alkoxy, and halo; $R_2$ is a member selected from the group consisting of hydrogen and methyl; $R_3$ is a member selected from the group consisting of a hydrogen, lower alkyl, cyclohexyl, benzyl and phenyl; and X is a member selected from the group consisting of chloro, hydroxy, lower alkoxy, phenoxy, lower alkoxy-lower alkoxy, and

wherein $R_4$ and $R_5$ independently represent a member selected from the group consisting of hydrogen, lower alkyl, lower alkoxy and lower alkyl phenyl.

2. A compound of the formula

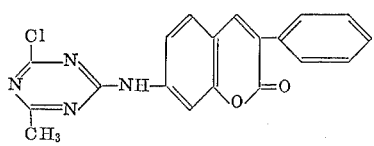

3. A compound of the formula

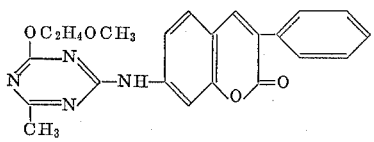

4. A compound of the formula

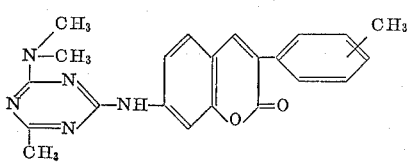

5. The compound of the formula

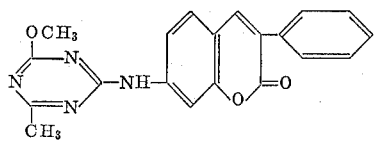

6. The compound of the formula

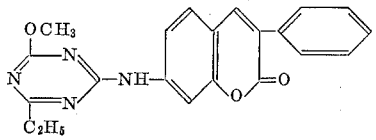

References Cited by the Examiner
UNITED STATES PATENTS

| | | | |
|---|---|---|---|
| 2,791,564 | 5/1957 | Fleck | 252—301.2 |
| 2,945,033 | 7/1960 | Hausermann | 260—247.5 |
| 2,945,762 | 7/1960 | Carroll et al. | 96—100 |
| 2,993,897 | 7/1961 | Shapiro et al. | 260—249.9 |
| 3,012,971 | 12/1961 | Gessner et al. | 252—301.2 |
| 3,102,886 | 9/1963 | Weber et al. | 260—249.5 |
| 3,123,617 | 3/1964 | Hausermann | 260—310 |

WALTER A. MODANCE, *Primary Examiner.*
JOHN D. RANDOLPH, *Examiner.*